March 21, 1950          E. A. BRANDT          2,501,259
ADJUSTABLE NOSE PAD FOR SPECTACLES
Filed May 29, 1947
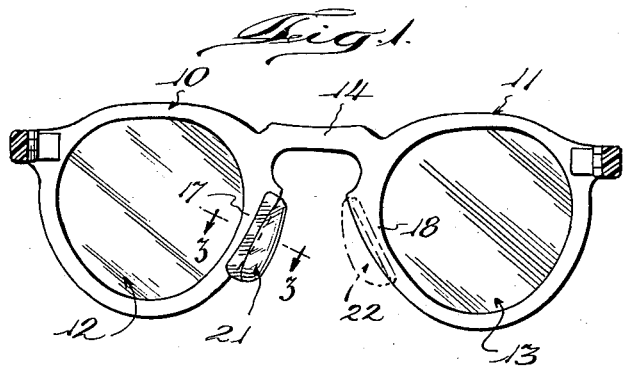
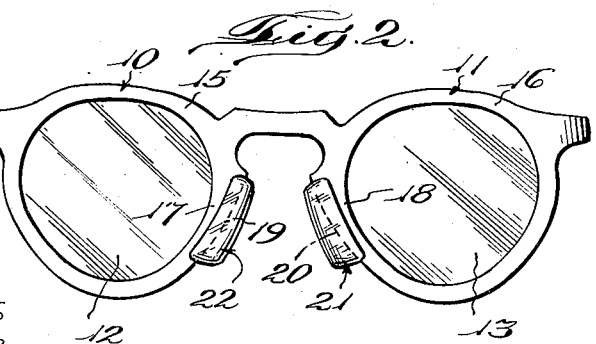
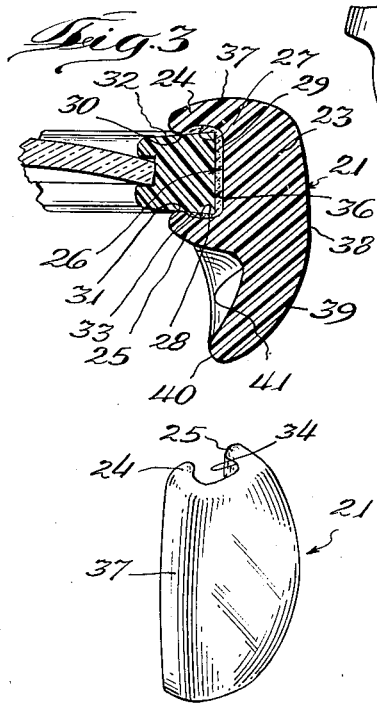
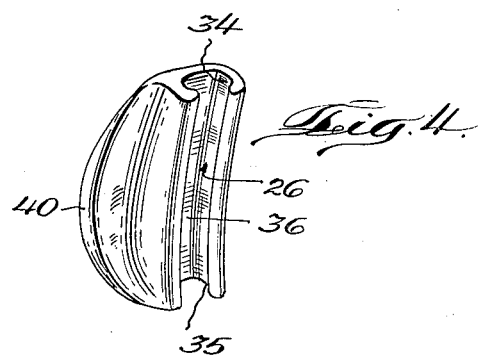
INVENTOR.
Edward A. Brandt
By Robert H. Wendt
Attorney Patented Mar. 21, 1950

2,501,259

UNITED STATES PATENT OFFICE 2,501,259

ADJUSTABLE NOSE PAD FOR SPECTACLES

Edward A. Brandt, River Grove, Ill.

Application May 29, 1947, Serial No. 751,249

3 Claims. (Cl. 88—48)

1

The present invention relates to eyeglass frames and methods of making and adjusting the same.

One of the objects of the invention is the provision of improved eyeglass frames and methods of making or adjusting the same by means of which the eyeglasses may be individually adjusted at the nose section thereof so that it will conform to the contour of the nose of the wearer without necessity for bending the frame.

Another object of the invention is the provision of improved nose pads for eyeglass frames which are adapted to be integrally secured to eyeglass frames of the same material for the purpose of extending the frame outward or to allow the frame to rest upon the nose at the proper position for each individual patient.

Another object of the invention is the provision of an improved method of making extreme adjustments for eyeglasses at the nose section thereof, and an improved form of nose pad which can be shaped to the contour of the nose at the time the patient is being fitted with the glasses.

A further object of the invention is the provision of an improved eyeglass frame construction which is sturdy and light, which may be adjusted to a perfect fit, and which is adapted to maintain its fit substantially throughout the life of the eyeglasses.

Another object of the invention is the provision of an improved mode of fitting eyeglass frames which permits one adjustment of the eyeglass frames to the nose of the patient without twisting or turning the frames, and without necessity for spending a great deal of time or requiring a number of visits on the part of the patient.

A further object of the invention is the provision of an improved frame construction and frame pad for eyeglasses by means of which the pad may be temporarily secured on the frame, to be tested by the wearer, and thereafter adjusted into the exact position desired, while the pads are so held on the frame, after which they may be permanently secured in such adjusted position.

Another object of the invention is the provision of an improved eyeglass frame provided with adjustable pads for engaging the bridge of the nose, which permits the adjustment of the pads in practically every direction to secure the proper tilt with respect to the frame and to secure the proper position of the pads on the frame for each individual user.

Other objects and advantages of the invention will be apparent from the following description and the accompanying drawings, in which similar characters of reference indicate similar parts throughout the several views.

Referring to the single sheet of drawings,

Fig. 1 is a fragmentary rear elevational view of a pair of eyeglasses equipped with the adjustable pads embodying my invention;

Fig. 2 is a front elevational view of the pair of eyeglasses of Fig. 1;

Fig. 3 is a fragmentary sectional view on an enlarged scale, taken on the plane of the line 3—3 of Fig. 1, looking in the direction of the arrows;

Fig. 4 is a view in perspective of one of the adjustable pads as seen from the top and outer side, that is, the side toward the frame;

Fig. 5 is a similar view in perspective of the pad as seen from the top and rear inside of the pad.

The eyeglass frames and adjustment pads embodying the present invention are preferably made out of a suitable plastic, such as, for example, a cellulose acetate or a cellulose acetate butyrate, which may be purchased on the open market under the name of "Tenite." This plastic is soluble in various solvents, such as acetone or acetic acid, or chloroform, the preferred solvent being acetone.

Various other modern plastics may be employed, such as, for example, the acrylic resins or methyl methacrylate, known on the market as "Lucite" or "Plexiglas," and which are also capable of being dissolved by the same solvents. In the latter case, both the frames and the adjustment pads should again be made of the same plastic, so that they can be integrally joined together and bonded by a partial dissolving of the surface of both the adjustment pad and the frame at the point of application and juncture.

The eyeglass frames or spectacles with which the present invention may be employed may be of many different shapes and types, and the one which has been selected to illustrate the invention is merely exemplary of one form.

This eyeglass frame has a pair of frames or supporting members 10, 11 for the glasses 12, 13, the supporting members 10 and 11 being joined by an integral nose bridge piece 14.

The frames may comprise a complete endless loop about the glass 12 or 13, or in some cases may merely comprise the upper curved portions 15, 16 and the depending portions 17, 18 on each side of the nose. Such frames customarily come with a nose pad already attached to the depending portions 17, 18 at the edges 19, 20 thereof. The attached nose pads must, naturally, be placed in an average predetermined position so that they do not fit the individual physiognomy of the wearer; and these attached nose pads are preferably removed.

They can be removed by being bent backward and forward until they are broken off at the point of juncture at the edges 18 and 19. The nose pads constructed according to the present invention are indicated in their entirety by the numerals 21, 22, and these are preferably constructed as right hand or left hand members, one of each being employed upon each pair of glasses.

The present nose pads are shown in perspective in Figs. 4 and 5 and in section in Fig. 3. They are preferably provided with a body portion 23 of substantial thickness and of sufficient strength to support a pair of flanges 24, 25 which border a groove 26 for receiving the depending portions 17 and 18 of an eyeglass frame.

The groove 26 is preferably under-cut and slightly larger at 27 and 28 than the thickness of the eyeglass frame, thus providing a clearance and providing room for cement 29 between the walls of the groove and the depending portions 17 of the eyeglass frame.

Adjacent the end of each flange 24, 25 the flange is preferably provided with an inwardly extending curved rib 30 or 31 which is adapted to clamp the lateral surfaces 32, 33 of the eyeglass frame.

The shape of the pad may vary according to the particular needs of the wearer, but the pad is preferably curved upwardly and downwardly, that is, in the direction in which the groove 26 extends; and the groove 26 is open at both ends 34, 35.

The curvature of the base 36 of the groove is preferably substantially complementary to the curvature of the depending portions 17 and 18 of the eyeglass frames at the edges 19 and 20.

On its rear side 37 (Fig. 3) the pad is preferably substantially blunt in its curvature, being curved on a relatively large radius. The same is true of the curvature on its inner side 38. The curvature of the pad is gradually increased at 39 toward the lower and inner side, and the pad terminates in a bluntly curved edge at 40.

The bluntly curved edge 40 may be seen in Fig. 4 to be substantially circular in elevation; and for lightness the pad may be hollowed out at 41 on the same side on which the groove 26 is located.

Pads which are made of the plastics mentioned have the capability that they may have their flanges 24, 25 pressed together by the operator to decrease the width of the groove 26 at will.

The depending portions 17 and 18 of the standard frames are also widest at their edge portions 19 and 20. Thus the flanges 24, 25 of the pads may be so adjusted as to their spacing that they will snap on the depending portions 17 and 18 and will be retained thereon by clamping the portions 17 and 18 between the flanges 24 and 25, at least temporarily.

The method of adjusting the pads and securing them to suit the individual needs of a user is as follows: After the eyeglass frame has been selected and the attached pads have been removed from the rear face thereof, a pair of the present pads may have their flanges 24 and 25 adjusted either by pinching them together or spreading them apart so that they are adapted to be temporarily but adjustably secured by clamping the depending portions 17 and 18 of the eyeglass frames which are located on either side of the nose. The resilient clamping action of the flanges 24 and 25 on the outwardly flaring front and rear surfaces 32, 33 of the rim is sufficient to hold the pads on the rim, but the pads may be slid up and down on the curved edges of the rim, and due to the clearance provided in the groove may be rotated backwardly or forwardly upon the longitudinal axis of the groove to adjust the pads to the best fitting position for the pads and to the position which will hold the eyeglasses for optimum vision.

Then a right hand and a left hand pad 22 and 21 may be applied by snapping them on over the edge portions 19 and 20 on the depending parts 17 and 18. The eyeglasses may then be placed upon the face of the wearer, with the lenses adjusted to the proper position for best vision.

In doing this the pads 21 and 22 may be slid upward or downward in order to adjust the pads exactly into best engagement with the bridge of the nose, when the eyeglasses are at their best adjustment. The pads 21 and 22 are not necessarily always adjusted to the same height, although this is desirable from the point of view of symmetry of appearance.

They are preferably adjusted to the best position to hold the glasses in the proper position for best vision. In some cases it may be desirable to rotate the pad slightly upon an axis which is at right angles to the plane of the paper in Fig. 3. In such case this is permitted by the curvature and clearance at 27, 28 and 36.

The intervening space is then filled in with cement, which preferably comprises a plastic mixture of the same material of which the pads and eyeglass frames are made.

In other cases it may not be desirable to force the pads on the edges 19 and 20 until the base of the groove 36 engages the edges 19 and 20 at both ends of the groove. One end of the groove, such as, for example, the upper end 35, may have its base 36 tightly engaging the edges 19 and 20, while the other end of the groove, such as the end 35 below, may be pivoted inward to place the pads in position to engage a particularly narrow nose.

In such case the space between the edges 19 and 20 is preferably filled up with cement, such as the cement seen at 29 in Fig. 3. With the eyeglasses on the patient, the pads 21 and 22 may be moved up or down or pivoted inward or outward or rotated forward or backward until they are in the best possible position for the particular physiognomy of the patient.

They may then be secured in place by means of cement, as described; or in some cases it will only be necessary to use a suitable solvent, such as acetone, which melts sufficient of the inner surface of the grooves to make them sticky; and the same takes place on the adjacent surface of the eyeglass frames, so that the pad becomes integrally welded to the frame.

Thus the pads are then permanently secured by means of cement or by solvent welding so that they will remain in the desired position throughout the life of the glasses.

One of the most important advantages of the present invention lies in the fact that the pads can be temporarily secured in any of a multiplicity of adjusted positions on the eyeglass frames in adjusting the pads and permanently securing them in the final adjusted position.

My method of adjusting eyeglass frames comprises the temporary application of nose pads to the frames by clamping the nose pads on the frames by means of opposed shoulders on the nose pads so that the eyeglasses may then be tried on by the patient. The method includes the adjustment of the pads by sliding them upward or downward or pivoting them inward or outward on the frames or by a limited amount of backward or forward tilting, while the pads are thus clamped on the frames, in order to fit them accurately to the nose of the wearer.

The method includes making these adjustments while the spectacles are being worn and located in the position for optimum vision; and upon the pads being adjusted to the proper position, they are then permanently secured in place by means of cement or solvent.

Thus it is unnecessary to endeavor to bend the bridge piece or to twist the eyeglass frames; and the adjustment which is accomplished by the present method is one which is permanent in character, and which does not change with time.

When an adjustment is made by bending or twisting, the adjustment is not permanent because the frame has a predetermined amount of resiliency which will eventually tend to move the frame back into the position which it had before it was adjusted by bending or twisting.

The finished job should, of course, include the removal of all material necessary for removing roughness and polishing, and to remove any lines or irregularities that might cause discomfort to the patient.

It will thus be observed that I have invented an improved eyeglass construction, including nose pads which may be temporarily secured in such manner that they may be adjusted to the nose of the patient and then removed and permanently secured. By this means a standard eyeglass frame may be fitted exactly to the needs of each patient.

The bending of the frames is unsatisfactory in making adjustments because the elasticity of the frames tend to cause them to revert to their original set; and therefore frames which have been adjusted by bending of the frames result in complaints and repeated visits on the part of the patient. The building up of the frames at the points necessary to support the glasses in proper position on the nose of the patient results in a final and exact fit, with which the patient is initially and permanently satisfied.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An eyeglass frame structure comprising an eyeglass supporting frame having a nose bridge portion, joining a pair of lens supporting members, said members comprising rims having curved diverging rim portions located below said bridge portion, and the diverging rim portions having outwardly flaring back and front surfaces, said rims having front and back plane surfaces and a pair of nose pads, each pad having a body provided with a rearwardly projecting flange having a curved border, and each body having an inwardly facing nose-engaging surface and having an oppositely disposed groove, said groove being curved longitudinally to substantially the same curvature as the diverging rim portions and being bounded by a pair of resilient clamping flanges having inwardly facing curved rim clamping surfaces, for engaging the outwardly flaring surfaces of said rim, said grooves being enlarged inwardly of their said clamping surfaces to clear said rim and to permit limited rotary adjustment about the longitudinal axis of said groove, while held by said clamping flanges on said rims, the clearance between said grooves and rims having a cement filling to secure the pads and rims permanently in adjusted position for optimum vision of the wearer.

2. A nose pad for temporary securement by clamping action on the wedge-shaped depending rim portions of an eyeglass frame on either side of the nose, and for permanent securement by cementing, comprising a body of initially plastic material of elongated oval shape having a smooth convexly curved surface for engaging the nose, said body having a rearwardly projecting curved flange and having opposite to said convex surface a longitudinally extending groove, the said groove being bounded by front and rear clamping flanges, for engaging the front and rear of the wedge-shaped portions of said rims, and said flanges having inwardly facing curved rim engaging portions and the groove being enlarged inside said rim engaging portions to provide a clearance, the said groove being curved longitudinally to substantially the curvature of the rim portion on which it is to be secured, so that the pad may have its clamping flanges adjusted by pinching until they grip the rim, and the pad may be temporarily held on the rim by the clamping flanges while the eyeglass frame is fitted to the user, the clearance being employed for a cement filling to hold the pad in permanently adjusted position for maximum vision.

3. In an eyeglass frame, the combination of a supporting frame having a nose bridge portion, said nose bridge portion joining a pair of lens supporting members and being substantially in the same plane as said lens supporting members, said lens supporting members having downwardly extending and outwardly curved portions on each side of the nose of the wearer, below the nose bridge, the said curved portions having front and rear plane surfaces and tapering inwardly toward the lens so that the depending portions are substantially wedge shape, with a pair of nose pads, the said nose pads each including a curved nose-engaging surface and an elongated body provided on the side opposite to the nose-engaging surface, with a wedge shaped groove substantially larger than the wedge shaped depending portions of the frames, the said groove terminating in a pair of curved clamping flanges which engage said plane surfaces and permit the pad to be rotated forwardly and backwardly about the longitudinal axis of the pad, the said pad also having its groove curved longitudinally in substantially the same curvature as the said depending portions at their edges so that the pad may be slid upward and downward on the depending portions, the pads separating as they move downward, due to the fact that the depending portions diverge, thus permitting a spacing adjustment between the two pads, and cement in said groove for holding the pads firmly to the frames after the pads have been adjusted in position on the face of the wearer, the said groove in each pad being defined by a pair of outwardly projecting flanges on the front and back of the rim, which flanges can be pinched together to clamp the pads temporarily upon the rim while the cement hardens.

EDWARD A. BRANDT.

REFERENCES CITED

The following references are of record in the file of this patent:

UNITED STATES PATENTS

| Number | Name | Date |
|---|---|---|
| 222,123 | Blethen | Dec. 2, 1879 |
| 1,708,208 | Day | Apr. 9, 1929 |
| 1,742,163 | Levy | Dec. 31, 1929 |
| 2,003,846 | Wolff | June 4, 1935 |
| 2,093,121 | Adams | Sept. 14, 1937 |
| 2,269,037 | Oker | Jan. 6, 1942 |

FOREIGN PATENTS

| Number | Country | Date |
|---|---|---|
| 433,650 | Great Britain | Aug. 19, 1935 |
| 518,938 | Great Britain | Mar. 12, 1940 |
| 872,146 | France | Feb. 5, 1942 |